United States Patent [19]

Koubek

[11] 4,047,200
[45] Sept. 6, 1977

[54] SINGLE TUBE COLOR TELEVISION CAMERA WITH COLOR STRIP FILTERS

[75] Inventor: Michael Koubek, Munich, Germany

[73] Assignee: Siemens Aktiengesellschaft, Berlin & Munich, Germany

[21] Appl. No.: 392,860

[22] Filed: Aug. 30, 1973

[30] Foreign Application Priority Data

Sept. 6, 1972  Germany .............................. 2243698

[51] Int. Cl.² ............................................. H04N 9/07
[52] U.S. Cl. ..................................................... 358/47
[58] Field of Search .................... 178/5.4 ST; 358/44, 358/47, 48

[56] References Cited

U.S. PATENT DOCUMENTS

| | | | |
|---|---|---|---|
| 3,647,943 | 3/1972 | Marshall | 178/5.4 ST |
| 3,647,945 | 3/1972 | Hannan | 178/5.4 ST |
| 3,707,596 | 12/1972 | Kuhn | 358/31 |
| 3,719,771 | 3/1973 | Eto et al. | 178/5.4 ST |
| 3,763,312 | 10/1973 | Yoneyama | 178/5.4 ST |
| 3,828,121 | 8/1974 | Brandinger et al. | 358/44 |
| 3,882,535 | 5/1975 | Takemura | 358/44 |

FOREIGN PATENT DOCUMENTS 2,104,486  8/1971  Germany

OTHER PUBLICATIONS

Pritchard, Stripe-Color-Encoded Single-Tube Color-Television Camera Systems, RCA Review, vol. 34, June 1973, pp. 217-256.

*Primary Examiner*—John C. Martin
*Attorney, Agent, or Firm*—Hill, Gross, Simpson, Van Santen, Steadman, Chiara & Simpson

[57] ABSTRACT

A single tube color television camera employs a camera tube and two color strip filters located one behind the other in the optical image axis. The strip filters may either be installed in the camera tube or structurally separated therefrom and have different color filter effects whereby both filters have the color strips thereof angularly displaced with respect to the vertical image axis by the same angle, but in opposite directions. The television camera also comprises a decoding arrangement containing a comb filter for splitting the output signal of the camera tube to provide a luminous brightness signal and two color signals each having a spectrum containing frequencies which are shifted with respect to an integral multiple of the line frequency by a fraction of the line frequency, one color signal being shifted toward higher frequencies and the other toward lower frequencies.

2 Claims, 2 Drawing Figures

SUPERPOSED COLOR STRIP FILTERS

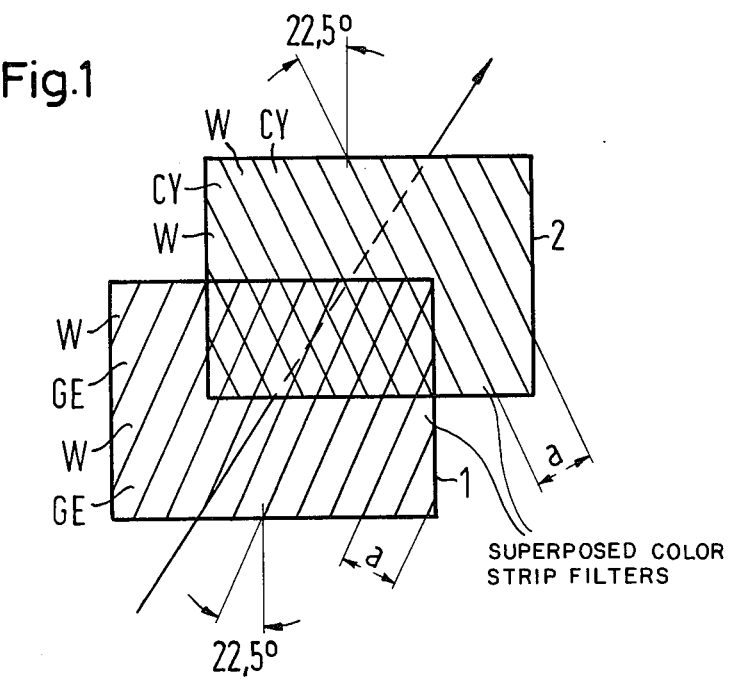
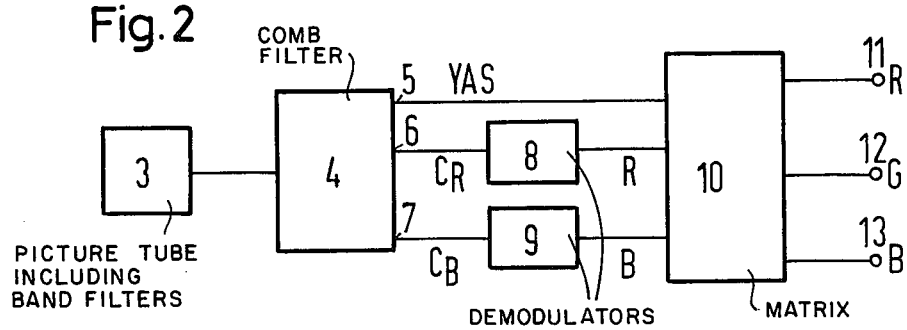

SINGLE TUBE COLOR TELEVISION CAMERA WITH COLOR STRIP FILTERS

BACKGROUND OF THE INVENTION

1. Field of the Invention

This invention relates to a single tube color television camera comprising a picture tube and two color strip filters of different color filter effect which are located one behind the other in the optical image axis and are either installed within the picture tube or are structurally separated therefrom, and more particularly to such a color television camera in which the color strip filters are oriented at the same angle with respect to the vertical image axis, but in opposite directions, and in which the camera comprises a decoding arrangement containing a comb filter for splitting the output signal of the picture tube.

2. Description of the Prior Art

Color strip filters are known in the art. For example, the German Offenlegungsschrift No. 1,956,940 discloses color strip filters consisting of strips of color selective filter material and non-selective light transmissive material disposed in an alternate arrangement of parallel strips. The color selective strips of two color strip filters which are disposed one behind the other select different color components for each filter. Therefore, a modulation of the luminance information scanned by the electron beam of the picture tube is created in that together the filters contain the entire chrominance information. The chrominance information consists of two parts which can be distinguished in that the strips of one filter are arranged basically at a right angle to the scanning lines, that is parallel to the vertical image axis, and those of the other filter are arranged at an angle with respect to the vertical image axis.

In the periodical "Proceeding of the IEE," February 1971, at Pages 322 to 323 there is a discussion of how the chrominance signal is composed as created by means of the aforementioned known color strip filter. It is thereby recognized in quality that, on the one hand, both chrominance informations have spectrums of frequencies which amount to a multiple of the line frequency and that, on the other hand, the spectral frequencies which originate from the color strip filter so oriented with respect to the vertical image axis are shifted in frequency in comparison to the spectral frequencies which originate from color strip filters which are not so angularly oriented, which means that both spectrums are joined with each other. However, also the luminance information is contained in the spectrum of the integral multiple of the line frequency. By means of a suitable choice of the color section of the color strip filters, a summation spectrum is obtained which is composed of a spectrum of the integral multiple of the line frequency containing, in a lower frequency range, the green information and, in a higher frequency range, the blue information, and of a spectrum of frequencies located therebetween containing the red information and being basically designed between the other two regions. By means of a comb filter, both spectrums can be separated from each other. The separation of the blue and green color informations from the same spectrum must be carried out by means of low pass filters and high pass filters, respectively. Therefore, blurriness in the separation cannot be avoided.

It is further known from Larsen et al, U.S. Pat. No. 3,781,519, granted Aug. 1, 1972 and corresponding to the German Offenlegungsschrift No. 2,163,443, to orient both color strip filters in respect of the vertical image axis by the same angle of rotation, however in a different direction of rotation. Again, the separation of the spectral frequencies takes place by means of a comb filter. A clean separation of the chrominance signals from the luminance signal, however, poses certain difficulties. In order to avoid Moire patterns it is suggested in this published application to filter out those frequencies which cause Moire patterns and erroneous color information with optical components. An optical phase refraction lattice is suggested for alignment so that the undesired frequencies are eliminated. However, a substantial disadvantage is achieved, namely that the luminance information is considerably limited.

SUMMARY OF THE INVENTION

The primary object of the present invention is to provide a single tube color television camera which, by using known color strip filters and with a minimum of decoding effort gives an optimum adaptation possibility for connection to transmission systems, as opposed to camera systems heretofore known in the art.

Above all, a blurriness in the separation of the luminance information and the two color informations is to be eliminated, such as cannot be avoided or which is exchanged for a considerable information loss in the aforementioned state of the art arrangements.

A further object of the invention resides in providing a color television camera which has an output signal composed in a quarter line offset.

According to the invention, the foregoing objects are realized through the provision of a single tube color television camera of the initially mentioned type which employs a comb filter having an output for a brightness signal and outputs for each of two color signals which are assigned to a color strip filter, whereby the spectrum of the two color signals contains frequencies which are shifted with respect to an integral multiple of the line frequency by a fraction of the line frequency. In particular, the frequency shifts are in the direction of higher frequencies for one of the color signals and in the direction of lower frequencies for the other color signal.

A single tube color television camera constructed according to the invention utilizes the fact that the energy of the brightness signal, as luminance information, increases by the integral multiple of the line frequency. In the gaps located therebetween, the chrominance information is accommodated. The corresponding chrominance signal is created by two color strip filters which are oriented in respect of the vertical image axis in opposite directions, but symmetrically at the same angle. This angle is decisive for the position of the chrominance spectral frequencies between the luminance spectral frequencies. Therefore, there is a clear assignment between the angle and its characterizing position of the two spectrums to each other if other magnitudes determining the frequency, such as for example the color strip distance, is disregarded. If the same angle, viewed absolutely, is selected for both color strip filters, the same frequency shift with respect to the luminance spectrum will result for both chrominance spectrums, only in different directions. A complete separation of all three spectrums is then easily accomplished by means of a comb filter.

A preferred and advantageous embodiment of the invention relates to the adaptation of a television camera to the European television standards, whereby the chrominance signal is joined with the luminance signal in a so-called quarter line offset. In order to provide a signal which is composed in such a manner, both color strip filters are oriented at the same angle in respect of the vertical image axis, the angle being calculated under the preferred condition that the individual color strips of the color strip filters have the same width and the same distance from each other according to the equation $$\alpha = \arc\sin a \cdot z/8y$$

wherein $a$ designates the color strip distance, $z$ designates the entire line number of the scanned image field and $y$ designates the height of the scanned image field. Thereby the spectral frequencies of one chrominance signal are shifted by a quarter of the line frequency in respect of the spectral frequencies of the luminance signal, which means of an integral multiple of the line frequency, in the direction of higher frequencies and those frequencies of the other chrominance signal deriving from the other color strip filter are shifted in the direction of lower frequencies.

BRIEF DESCRIPTION OF THE DRAWING

Other objects, features and advantages of the invention, its organization, construction and operation will be best understood from the following detailed description of a preferred embodiment of the invention taken in conjunction with the accompanying drawing, on which:

FIG. 1 is a schematic diagram of a pair of color strip filters oriented in accordance with the principles of the present invention; and FIG. 2 is a block diagram illustrated of an exemplary embodiment of a single tube color television camera constructed in accordance with the present invention.

DESCRIPTION OF THE PREFERRED EMBODIMENT

Referring to FIG. 1, a color strip filter 1 is illustrated as having color bands which are oriented at an angle with respect to the vertical image axis, the particular angle illustrated being 22.5° in the clockwise direction. The strips consist alternately of filter material GE which blocks the blue portion of the light spectrum and of material W which allows the entire light spectrum to pass therethrough. A second color strip filter 2 comprises parallel strips which alternately consist of filter material CY for blocking the red portion of the light spectrum and of the material W. The strips CY and W are oriented, again at 22.5°, counterclockwise with respect to the vertical image axis. The color strip filters 1 and 2 are superimposed, here illustrated somewhat extended, in the direction of the image axis which is denoted by an elongate arrow.

After a scanning, such a filter arrangement creates a signal which consists of three components: a low frequency luminous intensity or brightness component and two carrier frequency color components which correspond to the color components red and blue and constitute the entire chrominance information. The energy accumulation points of the two carrier frequency color components lie in spectral frequencies between the integral multiple of the line frequency which contains the luminance information. They are located symmetrically thereto in that the frequencies from the red component are shifted by the same amount, but in the opposite direction in respect of the frequencies of the luminance signal, as the frequencies of the blue component. By properly dimensioning the filters according to the above equation, the shifting for a quarter line offset can be achieved which is required for transmission, for example in accordance with PAL standards.

Referring to FIG. 2, a picture tube 3 is illustrated (including the band filters). A comb filter 4 is coupled to the picture tube 3 and has three outputs 5, 6 and 7. The output 5 directs the YAS signal as the luminance information to a matrix 10. The output 6 directs a chrominance signal $C_R$ corresponding to the red component to a demodulator 8, and the output 7 directs a chrominance signal $C_B$ corresponding to the blue component to a demodulator 9. The demodulators 8 and 9 supply corresponding demodulated color information signals R and B in the video frequency position to the matrix 10 to which the signal YAS is directed. The matrix 10 provides three outputs 11, 12 and 13 for the single tube color television camera to conduct the color signals R, G and B for red, green and blue, respectively, which are to be transmitted or further treated. The elements 4 to 10 constitute the decoding arrangement of the single tube color television camera.

A single tube color television camera which is constructed according to the invention does not only entail the advantage of a clear assignment of the two symmetrically oriented color strip filters to the frequency position of the individual components of the signal mixture supplied by the camera, but also the particular advantage that, unlike the state of the art arrangements, it is in a position to supply the full luminance information since the higher frequency portions can be separated clearly by means of the comb filter and do not have to be suppressed by additional filters.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A single tube color television camera comprising a picture tube and two color strip filters disposed one behind the other on the optical image axis, said color strip filters having different color filters effects, both of said filters being oriented at the same angle of rotation in respect of the vertical image axis and oriented in opposite directions with respect to each other, whereby the output signal of the picture tube is composed of three frequency spectrums which are interleaned with each other in the frequency axis, a first of said frequency spectrums corresponding to a luminance signal and consists of spectral lines for integral multiples of the line frequency, and the other two frequency spectrums corresponding to respective color signals and consist of spectral lines which occur in the individual frequency spectrum and in intervals of the value of the line frequency and shifted in respect of the spectral lines of said first frequency spectrum by a fraction of the line frequency in opposite directions for the two color signals, and said television camera further comprising a decoding arrangement including a comb filter for splitting the output signals of the picture tube, said comb filter including an input connected to receive the output signal of the picture tube, a first output for said luminance signal, a second output for one of said color signals, and a third output for the other of said color signals, so that all three frequency spectrums are available at said outputs in their entire scope and separated from each other.

2. A television camera according to claim 1 wherein the spectral frequencies of both color signals are shifted in each case by a quarter of the line frequency in respect of the integral multiple of the line frequency in different directions and the two color strip filters are oriented at said angle in accordance with the equation $$\alpha = \arc\sin a \cdot z/8y$$

where $a$ designates the color strip distance, $z$ designates the full line number of the scanned image field and $y$ designates the height of the scanned image field.

* * * * *